United States Patent
Han et al.

(10) Patent No.: US 8,660,570 B2
(45) Date of Patent: Feb. 25, 2014

(54) PHYSICAL CELL ID ALLOCATION METHOD AND BASE STATION

(75) Inventors: Lifeng Han, Shenzhen (CN); Yin Gao, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 195 days.

(21) Appl. No.: 13/122,534

(22) PCT Filed: Aug. 7, 2009

(86) PCT No.: PCT/CN2009/073151
§ 371 (c)(1),
(2), (4) Date: Apr. 4, 2011

(87) PCT Pub. No.: WO2010/051706
PCT Pub. Date: May 14, 2010

(65) Prior Publication Data
US 2011/0201345 A1    Aug. 18, 2011

(30) Foreign Application Priority Data
Nov. 7, 2008   (CN) .......................... 2008 1 0176056

(51) Int. Cl.
*H04W 72/00* (2009.01)
(52) U.S. Cl.
USPC ............................ 455/450; 455/436; 370/331
(58) Field of Classification Search
USPC ......... 455/436–439, 444, 450–454, 500, 421, 455/422.1; 370/331, 332
See application file for complete search history.

(56) References Cited

U.S. PATENT DOCUMENTS

| 6,178,327 B1 | 1/2001 | Gomez |
| 6,479,669 B2 | 11/2002 | Gabriel et al. |
| 7,477,920 B2 * | 1/2009 | Scheinert et al. ............. 455/561 |

(Continued)

FOREIGN PATENT DOCUMENTS

| CN | 1863401 A | 11/2006 |
| CN | 101052196 | 10/2007 |

(Continued)

OTHER PUBLICATIONS

International Search Report in international application No. PCT/CN2009/073151, mailed on Sep. 24, 2009.

(Continued)

*Primary Examiner* — Cong Tran
(74) *Attorney, Agent, or Firm* — Edwards Wildman Palmer LLP; Howard M. Gitten (57) ABSTRACT

The present invention discloses a Physical Cell ID (PCI) allocation method and a base station. The PCI allocation method includes the following steps: a target base station obtains a usable PCI list sent by an Operations And Maintenance (OAM) function entity, and removes limited PCIs of the target cell from the usable PCI list to obtain a selectable PCI set (step S102); the target base station obtains the E-UTRA Absolute Radio Frequency Channel Number (EARFCN) information of neighbor cells of serving cells via an X2 interface message, and obtains a first reference PCI set in a predefined manner, cell EARFCN information in the first reference PCI set is different from that of the target cell of the target base station (step S014); the target base station forms a second reference PCI set based on the intersection of the usable PCI list and the first reference PCI set (step S106); if the selectable PCI set is empty, then a PCI is randomly selected from the second reference PCI set as the target PCI (step S108). The success rate of the PCI allocation for the target cell is improved by the present invention.

21 Claims, 4 Drawing Sheets

(56) References Cited

U.S. PATENT DOCUMENTS

| | | | |
|---|---|---|---|
| 7,876,729 B1* | 1/2011 | Grilli et al. | 370/332 |
| 2002/0010342 A1 | 1/2002 | Gabriel | |
| 2008/0132239 A1* | 6/2008 | Khetawat et al. | 455/438 |
| 2008/0305799 A1* | 12/2008 | Zuniga et al. | 455/437 |
| 2009/0061877 A1* | 3/2009 | Gallagher et al. | 455/436 |
| 2009/0170516 A1* | 7/2009 | Ostrup et al. | 455/436 |
| 2009/0233601 A1* | 9/2009 | Vikberg et al. | 455/436 |
| 2009/0275332 A1* | 11/2009 | Niska et al. | 455/436 |
| 2010/0130199 A1* | 5/2010 | Piercy et al. | 455/434 |
| 2010/0285802 A1* | 11/2010 | Ahluwalia et al. | 455/436 |
| 2012/0302245 A1* | 11/2012 | Huang | 455/438 |

FOREIGN PATENT DOCUMENTS

| | | |
|---|---|---|
| CN | 101052196 A | 10/2007 |
| JP | 2010515368 A | 5/2010 |
| KR | 20050032949 A | 4/2005 |
| KR | 20070080544 A | 8/2007 |
| WO | 9701889 A2 | 1/1997 |
| WO | WO 97/01889 A2 | 1/1997 |
| WO | 2006054341 A1 | 5/2006 |
| WO | 2008082587 A1 | 7/2008 |

OTHER PUBLICATIONS

English Translation of the Written Opinion of the International Search Authority in international application No. PCT/CN2009/073151, mailed on Sep. 24, 2009.

International Search Report (PCT/CN2009/073151) dated Sep. 12, 2009.

English Language Abstracts for CN101052196; and CN1863401 A, Oct. 10, 2007.

* cited by examiner

PHYSICAL CELL ID ALLOCATION METHOD AND BASE STATION

CROSS REFERENCES TO RELATED APPLICATIONS

This application is a U.S. national phase application pursuant to 35 U.S.C. §371, of PCT/CN2009/073151 filed on Aug. 7, 2009, which claims priority to Chinese Patent Application No. 200810176056.7 filed on Nov. 7, 2008. The entire contents of the aforementioned patent applications are incorporated herein by these references.

TECHNICAL FIELD

The present invention relates to the field of communications, particularly to a physical cell ID allocation method and a base station.

BACKGROUND

With the development of mobile communication technologies, the number of E-UTRAN Nodes B (eNB) is increased in a Long Term Evolution (LTE) system; if a conventional manual method is still employed to mount, configure and maintain the eNBs, then a large quantity of manpower, physical resources and financial resources will be consumed.

In order to lower the operation and maintenance cost of the system, a Self Organizing Network (SON) is developed, which is a mobile communication network capable of mounting, configuring and maintaining eNBs automatically, reducing workload compared with the conventional manual maintenance, and consequentially lowering the operation and maintenance cost for an operator.

For the SON, the automatic allocation of a Physical Cell ID (PCI) is one of the important contents. The PCI is a basic configuration parameter of a radio cell. When a new eNB is added into the network, it is required to allocate a PCI for each cell supported by the eNB to avoid the interference among neighbour cells.

Conventionally, the PCI is allocated via network planning, and the PCI allocation is also a part of initial configuration performed by a base station. The PCI allocation should prevent cells in a given coverage area from being conflicted in physical ID as effectively as possible and avoid the interference among cells that are neighbour to each other in physical location. At present, there are two main automatic PCI allocation methods: a centralized method and a distributed method, wherein the centralized method comprises the following steps: an Operations And Maintenance (OAM) function entity notifies an eNB of a given PCI value, and the eNB takes the given PCI value as the PCI of a new cell; the distributed method comprises the following steps: an OAM function entity notifies an eNB of a usable PCI value list, and the eNB removes a limited PCI set from the list and randomly selects a value from the remainder PCI value list as the PCI of a new cell, wherein the limited PCI set of the eNB comprises: a PCI reported by a User Equipment (UE) to the eNB, a PCI reported to the eNB by a neighbour eNB of the eNB via an X2 interface, and a PCI obtained by other methods, such as a PCI monitored by the eNB automatically. Generally, the PCIs in the limited PCI set are those used by surrounding cells of the new cell.

However, as there are only 504 PCIs and often more eNBs in an LTE system, there may be no PCI value selected for some eNBs if the distributed method is employed to allocate PCI values. For example: usable PCI values in the list given by an OAM function entity are few for various reasons while the limited PCI values reported by neighbour eNBs via X2 interfaces are many, some eNBs cannot obtain qualified PCIs.

SUMMARY

Considering the problem existing in relevant technologies that a base station cannot select PCIs for the supported cells when a distributed method is employed to perform PCI allocation, an object of the present invention is to provide a method for transmitting E-UTRA Absolute Radio Frequency Channel Number (EARFCN) information among base stations, and synchronously provide a PCI allocation method and a base station by using the transmission method to solve the above-mentioned problem.

In order to realize the above-mentioned object, according to one aspect of the present invention, a method for transmitting EARFCN information among base stations is provided.

According to the present invention, the method for transmitting EARFCN information among base stations comprises: a source base station and a target base station mutually transmit EARFCN information of neighbour cells of serving cells in the charge of the source and the target base stations via an X2 interface message, wherein the EARFCN information of the neighbour cells of the serving cells is used for selecting a physical cell ID.

In order to realize the above-mentioned object, according to another aspect of the present invention, a physical cell ID allocation method for allocating a Physical Cell ID (PCI) by a target base station to a target cell belonging to the target base station is provided.

According to the present invention, the physical cell ID allocation method comprises: a target base station obtains a usable PCI list sent by an Operations And Maintenance (OAM) function entity, and removes limited PCIs of the target cell from the usable PCI list to obtain a selectable PCI set; an X2 interface message of the target base station comprises EARFCN information of neighbour cells of serving cells; the target base station obtains the EARFCN information of the neighbour cells of the serving cells via the X2 interface message and obtains a first reference PCI set in a predefined manner, wherein cell EARFCN information in the first reference PCI set is different from that of the target cell of the target base station; the target base station forms a second reference PCI set based on the intersection of the usable PCI list and the first reference PCI set; and the target base station randomly selects a PCI from the selectable PCI set as the PCI of the target cell, or randomly selects a PCI from the second reference PCI set as the PCI of the target cell if the selectable PCI set is empty.

In order to realize the above-mentioned object, according to another aspect of the present invention, a base station is provided.

According to the present invention, the base station comprises: a first obtaining module, which is used for obtaining a usable PCI list sent by an Operations And Maintenance (OAM) function entity and limited PCIs of a target cell; a first processing module, which is used for removing the limited PCIs of the target cell from the usable PCI list to obtain a selectable PCI set; a second obtaining module, which is used for obtaining a first reference PCI set in a predefined manner according to E-UTRA Absolute Radio Frequency Channel Number (EARFCN) information of a cell obtained by an X2 interface message, wherein the cell EARFCN information in the first reference PCI set is different from that of the target cell; a second processing module, which is used for to forming a second reference PCI set based on the intersection of the first reference PCI set obtained by the second obtaining module and the usable PCI list; a selecting module, which is used for selecting a PCI for the target cell; and a calling module, which is used for calling the selecting module which randomly selects a PCI from the selectable PCI set obtained by the first processing module as the PCI of the target cell, and randomly selects a PCI from the second reference PCI set obtained by the second processing module as the PCI of the target cell if the selectable PCI set is empty.

By adopting at least one of the above-mentioned technical solutions, the PCI of a cell whose EARFCN information is different from that of a target cell is taken as the PCI of the target cell when a distributed method is adopted; compared with the prior art, the present invention can increase the success rate of the PCI allocation for the target cell and avoid the PCI conflict and the interference among cells.

BRIEF DESCRIPTION OF THE DRAWINGS

The drawings are used to provide further understanding about the present invention, constitute a part of the description, are used together with the embodiments of the present invention to explain the present invention, and do not constitute any limitation to the present invention In the drawings.

DETAILED DESCRIPTION

Function Overview

As the number of PCIs is limited in a current LTE system, PCI multiplex can be considered during automatic configuration of PCIs. For an LTE cell, in the case of a same-frequency network, severe interference will be caused among cells if neighbour cells have the same frequency and the same PCI, which disables a cell; in the case of a different-frequency network, neighbour cells may be allowed to have different frequencies and the same PCI, because no interference will be caused and a conflict among the physical IDs of cells will be further avoided when the EARFCN information of the cells is different. Therefore, a new cell may be allowed to multiplex PCIs of neighbour cells with different frequencies. Based on the above-mentioned idea, the present invention discloses a method for transmitting EARFCN information among base stations and a PCI allocation method by using the transmitting method to solve the problem existing in the prior art.

The present invention is described below in detail by reference to the drawings.

METHOD EMBODIMENT 1

According to an embodiment of the present invention, a method for transmitting EARFCN information among base stations is provided, and a PCI allocation method by using the transmitting method is also provided.

It should be noted that for the sake of description facilitation, the technical solutions of the embodiment of the present invention are illustrated and described in the form of steps. The steps illustrated below can be carried out in a computer system in which a group of computers can execute instructions. Although the logical order of the steps is shown in related drawings, the illustrated or described steps may be carried out in a different order in some cases.

The embodiment and the characteristics disclosed in the embodiment can be combined if no conflict is caused.

Figure 1:
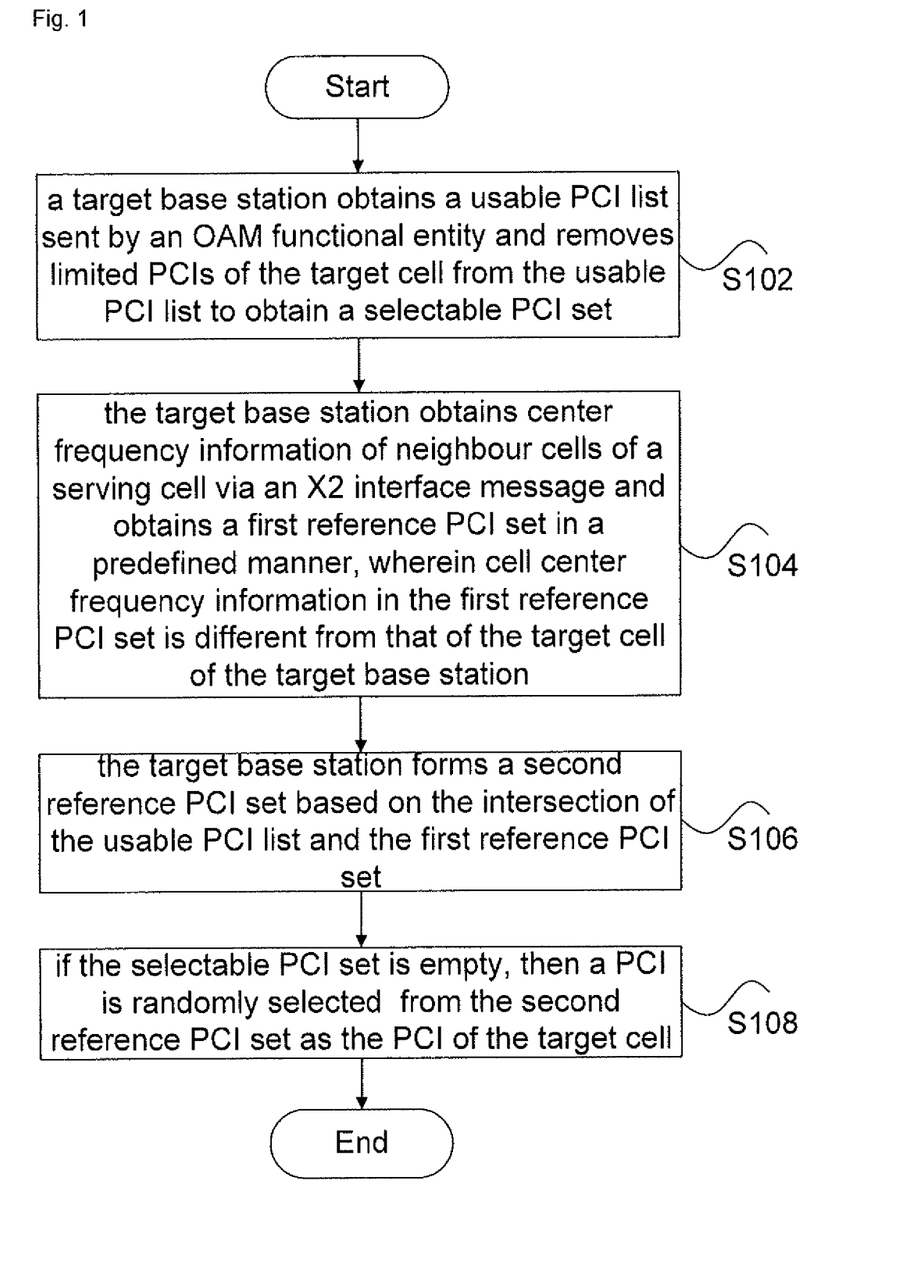
FIG. 1 is a flow chart illustrating a PCI allocation method according to a method embodiment of the present invention.

FIG. 1 is a flow chart illustrating a PCI allocation method according to an embodiment of the present invention, as shown in FIG. 1, PCI allocation performed by a target base station for a target cell belonging to the target base station comprises the following steps (S102-S108).

S102: a target base station obtains a usable PCI list sent by an OAM function entity and removes limited PCIs of a target cell from the usable PCI list to obtain a selectable PCI set.

S104: an X2 interface message of the target base station comprises EARFCN information of neighbour cells of serving cells which is used for selecting a PCI; wherein the X2 interface message comprises at least one of the following: an X2 setup request message, an X2 setup response message and an eNB configuration update message; the target base station obtains the EARFCN information of the neighbour cells of the serving cells via the X2 interface message and obtains a first reference PCI set in a predefined manner, wherein cell EARFCN information in the first reference PCI set is different from that of the target cell of the target base station.

S106: the target base station forms a second reference PCI set based on the intersection of the usable PCI list and the first reference PCI set.

S108: the target base station randomly selects a PCI from the selectable PCI set as the PCI of the target cell, or randomly selects a PCI from the second reference PCI set as the PCI of the target cell if the selectable PCI set is empty.

The first reference PCI set herein refers to a PCI set of surrounding cells different in frequency from the target cell.

The target base station can determine the first reference PCI set through the following four predefined methods:

Method 1: the target base station collects, via an X2 interface, the PCIs and the EARFCN information of cells supported by all base stations in X2 connection with the target base station and the PCIs and the EARFCN information used by neighbour cells of the cells supported by all base stations; and the target base station determines the PCIs of one or more cells corresponding to the collected EARFCN information which is different from that of the target cell as the first reference PCI set.

Method 2: the target base station collects, via an X2 interface, the PCIs and the EARFCN information used by neighbour cells of cells supported by all base stations in X2 connection with the target base station; and the target base station determines the PCIs of one or more cells corresponding to the collected EARFCN information which is different from that of the target cell as the first reference PCI set.

Method 3: the target base station collects, via an X2 interface, the PCIs and the EARFCN information used by neighbour cells of cells supported by all base stations in X2 connection with the target base station; and the target base station removes the PCIs of all cells whose EARFCN information is different from that of the target cell, reported by user equipment, from the PCIs of one or more cells corresponding to the collected EARFCN information different from that of the target cell to obtain one or more PCIs, and determines these PCIs as the first reference PCI set.

Method 4: the target base station collects the PCIs and the EARFCN information of surrounding cells reported by user equipment, the PCIs and the EARFCN information of cells supported by all base stations in X2 connection with the target base station via an X2 interface, the PCIs and the EARFCN information used by neighbour cells of cells supported by all base stations, and the PCIs and the EARFCN information of surrounding cells monitored by the target base station itself, and the target base station determines the PCIs of one or more cells corresponding to the collected EARFCN information different from that of the target cell as the first reference PCI set.

In addition, if the selectable PCI set is empty, then the target base station sends a first response message to the OAM function entity to notify the OAM function entity that it has been failed to select a PCI for the target cell from the selectable PCI set; after obtaining the response message, the OAM function entity determines whether the target base station has selected a PCI for the target cell from the second reference PCI set and sends the result of the determination to the target base station.

If the target base station fails to allocate a PCI to the target cell by selecting one from the second reference PCI set, then it sends a second response message to the OAM function entity to notify the OAM function entity that it has been failed to select a PCI for the target cell from the second reference PCI set.

By adopting the technical solution provided by an embodiment of the present invention, the PCI of a cell whose EARFCN information is different from that of the target cell is taken as the PCI of the target cell when a distributed method is adopted; compared with the prior art, the success rate of the PCI allocation for the target cell is increased, the PCI conflict and the interference among cells are avoided, and consequentially, the operation performance of a network is improved while the operation and maintenance cost of a network is reduced.

EXAMPLE

Figure 2:
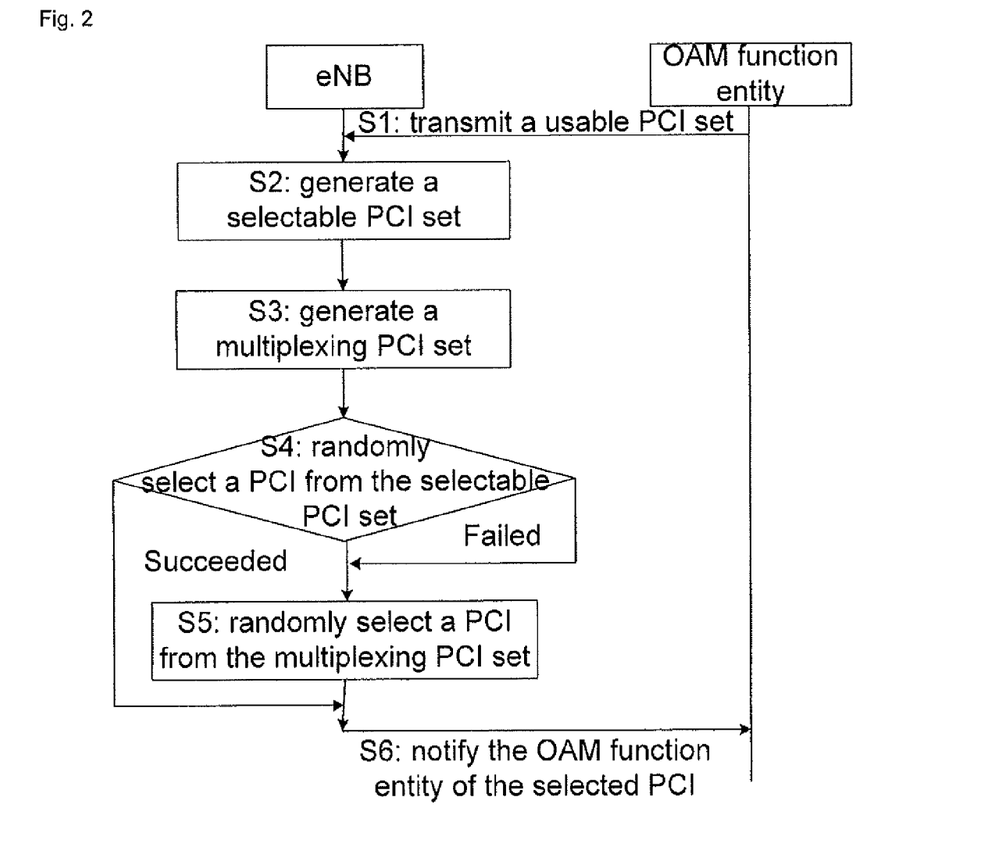
FIG. 2 is a flow chart illustrating the detailed processing of a PCI allocation method according to a method embodiment of the present invention.

If a new eNB is added to a system, an automatic configuration is needed to realize PCI allocation for the cells belonging to the new eNB to facilitate the normal running of the cells. FIG. 2 is a flow chart illustrating PCI allocation performed by an eNB for a cell supported by the eNB through an automatic configuration according to the present invention, for the sake of an explicit description, this embodiment is illustrated by taking the PCI allocation performed by the eNB for cell 1 (the above-mentioned target cell) as an example, the PCI allocation comprises the following steps.

S1: an OAM function entity sends a usable PCI set to an eNB; for example, the OAM function entity sends a usable PCI value list to the eNB according to a PCI planning principle and the requirement of an operator.

S2: the eNB obtains a PCI set used by surrounding cells of cell 1 through monitoring or a report from UE or X2 interfaces; in order to make cell 1 use a PCI different from those of the surrounding cells of cell 1, the eNB takes the PCI set used by the surrounding cells as a limited PCI set and removes the limited PCI set from the usable PCI set to obtain a selectable PCI set (the above-mentioned selectable PCI set) (corresponding to step S102), i.e., the PCIs in the selectable PCI set are available to cell 1, and a PCI selected by cell 1 from the selectable PCI set is guaranteed not to be the same as that used by a surrounding cell.

S3: the eNB collects, via an X2 interface, the PCIs and the EARFCN information of cells supported by all base stations in X2 connection with the eNB and the PCIs and the is EARFCN information used by neighbour cells of the cells supported by all base stations, selects, from all the obtained cells, the PCIs of cells whose EARFCN information is different from that of cell 1, determines a PCI set (the above-mentioned first reference PCI set) of a cell whose EARFCN information is different from that of cell 1 (corresponding to step S104), and obtains a multiplexing PCI set (the above-mentioned second reference PCI set) (corresponding to step S106) based on the intersection of the PCI set and the usable PCI set sent by the OAM function entity; the Pas in the multiplexing PCI set are available to cell 1, and a PCI value selected by cell 1 from the multiplexing PCI set is identical to the PCI value of a different-frequency neighbour cell of cell 1.

In order to obtain the EARFCN information used by neighbour cells of cells supported by all base stations in X2 connection with the eNB, the EARFCN information of neighbour cells of the serving cells should be transmitted via an X2 interface message besides the PCI of neighbour cells of the serving cells. Neighbour cell information of the serving cell is expanded in an X2 setup request message and an X2 setup response message generated in an X2 message setup process in FIG. 3 and an eNB configuration update message generated in an eNB configuration update process shown in FIG. 4, existing information of neighbour cells comprises the PCIs and the overall IDs of themselves and the EARFCN information of a newly added cell; the specific information structure is shown in the structural diagram of the EARFCN information of the neighbour cells of the serving cells in the following table 1.

TABLE 1

| Cell name | Existence situation | IE type and reference information |
| --- | --- | --- |
| Selectable EARFCN information | | |
| >FDD mode | | |
| >>EARFCN-FDD | | |
| >>>uplink EARFCN | M | (0 . . . the most EARFCNs), the most EARFCNs allowed to be supported by the current base station is 32767 |
| >>>downlink EARFCN | M | (0 . . . the most EARFCNs), the most EARFCNs allowed to be supported by the current base station is 32767 |
| >TDD mode | | |
| >>EARFCN | M | (0 . . . the most EARFCNs), the most EARFCNs allowed to be supported by the current base station is 32767 |

Figure 3:
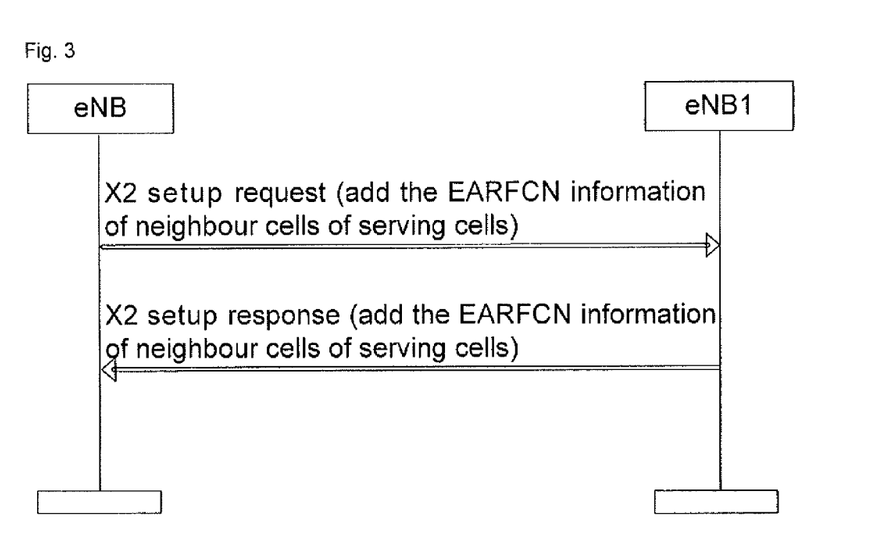
FIG. 3 is a flow chart illustrating message setup based on an X2 interface according to a method embodiment of the present invention.
Figure 4:
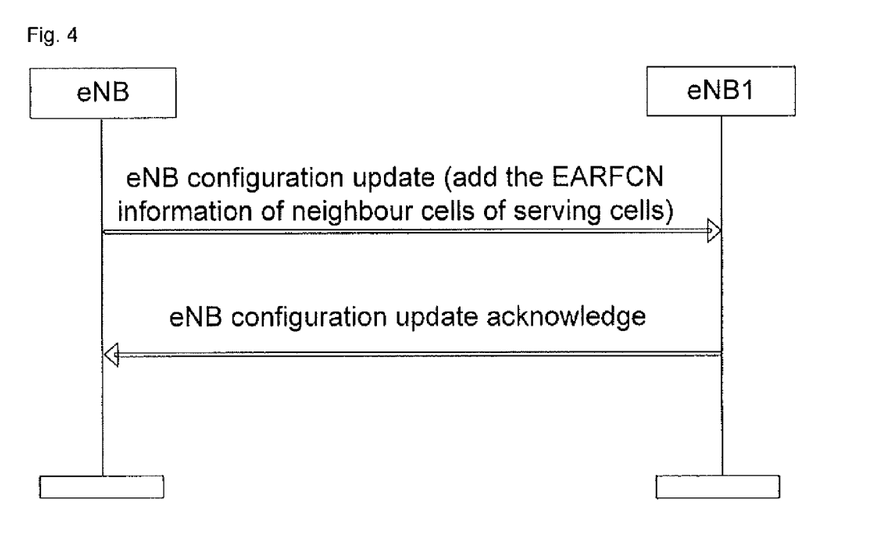
FIG. 4 is a flow chart illustrating eNB configuration update according to a method embodiment of the present invention.

FIG. 3 is a flow chart illustrating message setup based on an X2 interface according to an embodiment of the present invention, as shown in FIG. 3, an eNB is a newly established base station, eNB1 is a neighbour base station of the eNB, the eNB sends an X2 setup request to the eNB1, if three cells a, b, c belong to the eNB1, a neighbour cell of cell a is cell d, a neighbour cell of cell b is cell e, and cell c has no neighbour cell, then the eNB1 sends the PCIs and the EARFCN information of the cells a, b, c, d, e to the eNB via an X2 setup response. Providing that the PCI set of {a, b, c, d, e} is {O, P, Q, R, S} and the cells c, d, e are different in frequency from cell 1; then the PCI set {Q, R, S} is the above-mentioned first reference PCI set, the eNB gets the intersection of the PCI set {Q, R, S} and the usable PCI set sent by the OAM function entity; and providing that the obtained intersection is {Q, S}, the multiplexing PCI set (the above-mentioned second reference PCI set) is {Q, S}.

S4: the eNB selects a PCI value for cell 1 first from the selectable PCI set, i.e., randomly selects a PCI value from the selectable PCI set as the PCI of cell 1, if the random PCI value selection is successful, then the randomly selected PCI value is set as the PCI of cell 1 and then turns to S6, or turns to S5 if the random PCI value selection is failed;

S5: the eNB selects a PCI value for cell 1 from the multiplexing PCI set (corresponding to step S108), i.e., randomly selects a PCI value from the multiplexing PCI set as the PCI of cell 1 and sets the PCI value as the PCI of cell 1, and then turns to S6;

S6: the eNB notifies the OAM function entity of the PCI value of cell 1.

Preferred embodiments of the present invention are described below.

Preferred embodiment 1: in step S3, the eNB only collects the PCIs and the EARFCN information used by neighbour cells of cells supported by all base stations in X2 connection with the eNB via an X2 interface, then selects, from all obtained cells, the PCIs of cells whose EARFCN information is different from that of cell 1, to determine a PCI set (the above-mentioned first reference PCI set) of the cells whose EARFCN information is different from that of cell 1, and obtains a multiplexing PCI set based on the intersection of the PCI set and the usable PCI set sent by the OAM function entity; thus, the PCI of a cell supported by all base stations in X2 connection with the eNB is excluded from the multiplexing PCI set, and as a consequence, the probability of PCI confusion is lowered.

Preferred embodiment 2: on the basis of preferred embodiment 1, different-frequency cells, which may be neighbour to cell 1, should be further guaranteed not to multiplex the same PCI in order to reduce the probability of PCI confusion among cells due to the repetition of a PCI allocated to cell 1 with that used by a neighbour cell with a different frequency, then the multiplexing PCI set of the present invention can be generated by the following method: the eNB obtains a PCI set of neighbour cells of the cells of all neighbour base stations, wherein the PCI set is reported via X2 interfaces and the neighbour cells are different in frequency from cell 1 to be allocated with a PCI, removes the PCIs of all cells reported by UE or obtained by other methods to obtain a PCI set (the above-mentioned first reference PCI set), wherein the all cells are different in frequency from cell 1 to be allocated with a PCI, and then, based on the intersection of the obtained PCI set and the usable PCI set sent by the OAM function entity, obtains a multiplexing PCI set. By adopting this method, the PCIs in the multiplexing PCI set are available to cell 1 and the PCI value selected by cell 2 from the multiplexing PCI set may be repeated with that of a surrounding different-frequency cell, but the repetition probability will be greatly reduced, and the probability of PCI confusion among cells is consequentially lowered.

Preferred embodiment 3: in step S3, in order to increase the success rate of PCI selection of cell 1, different-frequency cells that may be neighbour to cell 1 may multiplex the same PCI, a PCI set (the above-mentioned first reference PCI set) of all cells that are different in frequency from cell 1 to be allocated with PCI in the limited PCI set is collected by the eNB, and then based on the intersection of the PCI set and the usable PCI set given by the OAM function entity, a multiplexing PCI set with a larger multiplexing range is generated.

Further, in step S4, if the allocation of a PCI in the selectable PCI set is failed, then the message interaction between the eNB and the OAM function entity may be increased, the base station sends a message to the OAM function entity to notify it of the failed PCI selection of cell 1, and then the OAM function entity sends a message to the base station to notify the base station whether to carry out PCI multiplexing; in step S5, if the allocation of a PCI in the multiplexing PCI set is failed, then the message interaction between the eNB and the OAM function entity may be increased and used by the eNB to notify the OAM function entity of the failed PCI multiplexing of cell 1.

DEVICE EMBODIMENT

According to an embodiment of the present invention, a base station is provided.

Figure 5:
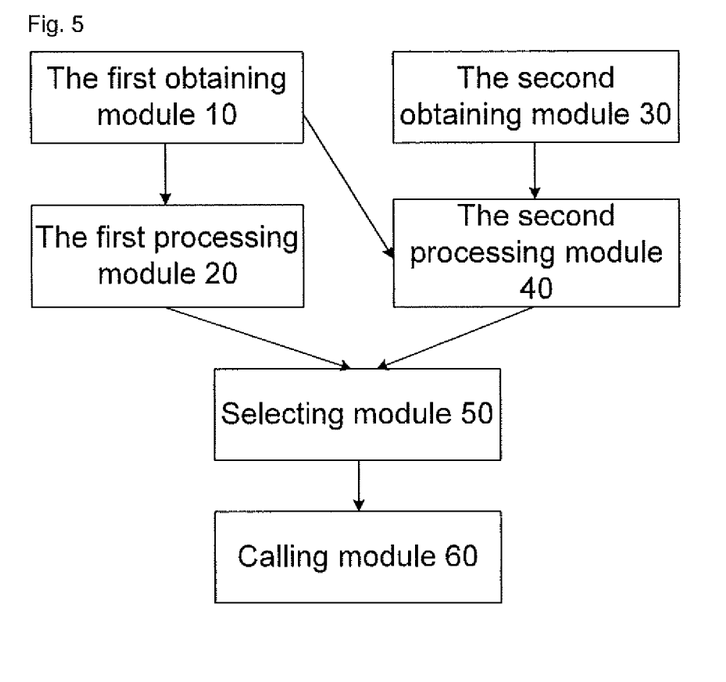
FIG. 5 is a structural diagram illustrating a base station according to a device embodiment of the present invention.

FIG. 5 is a structural block diagram illustrating a base station according to an embodiment of the present invention, as shown in FIG. 5, the base station comprises a first obtaining module 10, a first professing module 20, a first obtaining module 20, a second processing module 40, a selecting module 50 and a calling module 60, and the structure is described below.

The first obtaining module 10 is used for obtaining a usable PCI list sent by an OAM function entity and limited PCIs of a target cell; the first processing module 20 connected to the first obtaining module 10 is used for removing the limited PCIs of the target cell from the usable PCI list to obtain a selectable PCI set; the second obtaining module 20 is used for determining a first reference PCI set in a predefined manner according to cell EARFCN information of a cell obtained by an X2 interface message, wherein the cell EARFCN information in the first reference PCI set is different from that of the target cell; the second processing module 40, connected to the first obtaining module 10 and the second obtaining module 20, is used for determining a second reference PCI set based on the intersection of the first reference PCI set and the usable PCI list; the selecting module 50, connected to the first processing module 20 and the second processing module 40, is used for selecting a PCI for the target cell; and the calling module 60 connected to the selecting module 50 is used for calling the selecting module 50 which selects a PCI from the selectable PCI set obtained by the first processing module 20 as the PCI of the target cell, and randomly selects a PCI from the second reference PCI set obtained by the second processing module 40 as the PCI of the target cell if the selectable PCI set is empty.

By adopting the base station provided by the embodiment of the present invention, the PCI of a cell whose EARFCN information is different from that of the target cell is taken as the PCI of a target cell via a distributed method; compared with the prior art, the success rate of the PCI allocation for the target cell is increased, the PCI conflict and the interference among cells are avoided, and consequentially, the operation performance of the network is improved while the operation and maintenance cost of the network is reduced.

As mentioned above, by means of the PCI allocation method and/or the base station provided by the present invention, automatic PCI allocation performed by an eNB for a cell belonging to the eNB can be realized, particularly, a PCI value can be allocated for a to new cell through PCI multiplexing under the circumstances that PCI values are insufficient, thus, PCI conflict and the interference among cells are avoided, the success rate of automatic PCI allocation performed via a distributed method by an eNB in a dense network coverage area is increased, and consequentially, the operation performance of the network is improved while the operation and maintenance cost of the network is reduced.

The mentioned above is only the preferred embodiments of the present invention but not limitation on the present invention, for those skilled in this art, various modifications and variations can be devised, and it should be understood that these modifications, equivalent substitutes and variations made without departing from the spirit and the scope of the present invention should belong to the protection scope of the present invention.

What is claimed is:

1. A PHYSICAL CELL ID (PCI) allocation method for allocating a PCI by a target base station to a target cell belonging to the target base station, comprising:
    obtaining, by a target base station, a usable PCI list sent by an Operations And Maintenance (OAM) function entity;
    obtaining, by the target base station, E-UTRA Absolute Radio Frequency Channel Number (EARFCN) information of neighbour cells of serving cells via an X2 interface message; and
    removing, by the target base station, limited PCIs of the target cell from the usable PCI list to obtain a selectable PCI set according to the obtained the EARFCN information of the neighbour cells of the serving cells;
    wherein the removing, by the target base station, limited PCIs of the target cell from the usable PCI list comprises:
    obtaining, by the target base station, a first reference PCI set in a predefined manner, wherein cell EARFCN information in the first reference PCI set is different from that of the target cell of the target base station;
    forming, by the target base station, a second reference PCI set based on the intersection of the usable PCI list and the first reference PCI set; and
    randomly selecting, by the target base station, a PCI from the selectable PCI set as the PCI of the target cell, or randomly selecting, by the target base station, a PCI from the second reference PCI set as the PCI of the target cell if the selectable PCI set is empty.

2. The method according to claim 1, wherein the obtaining, by the target base station, a first reference PCI set in a predefined manner comprises:
    collecting, by the target base station via an X2 interface, the PCIs and the EARFCN information of cells supported by all base stations in X2 connection with the target base station and the PCIs and the EARFCN information used by neighbour cells of the cells supported by all base stations; and
    determining by the target base station the PCIs of one or more cells corresponding to the collected EARFCN information which is different from that of the target cell as the first reference PCI set.

3. The method according to claim 2, wherein
    if the selectable PCI set is empty, then the target base station sends a first response message to the OAM function entity to notify the OAM function entity that it has been failed to select a PCI for the target cell from the selectable PCI set; and
    after obtaining the response message, the OAM function entity determines whether the target base station has selected a PCI for the target cell from the second reference PCI set and sends the result of the determination to the target base station.

4. The method according to claim 2, wherein
    if the target base station fails to allocate a PCI to the target cell by selecting one from the second reference PCI set, then it sends a second response message to the OAM function entity to notify the OAM function entity that it has been failed to select a PCI for the target cell from the second reference PCI set.

5. The method according to claim 2, wherein the X2 interface message comprises: an X2 setup request message, an X2 setup response message and an eNB configuration update message.

6. The method according to claim 1, wherein the obtaining, by the target base station, a first reference PCI set in a predefined manner comprises:
    collecting, by the target base station collects, via an X2 interface, the PCIs and the EARFCN information used by neighbour cells of cells supported by all base stations in X2 connection with the target base station; and
    determining by the target base station the PCIs of one or more cells corresponding to the collected EARFCN information which is different from that of the target cell as the first reference PCI set.

7. The method according to claim 6, wherein
    if the selectable PCI set is empty, then the target base station sends a first response message to the OAM function entity to notify the OAM function entity that it has been failed to select a PCI for the target cell from the selectable PCI set; and
    after obtaining the response message, the OAM function entity determines whether the target base station has selected a PCI for the target cell from the second reference PCI set and sends the result of the determination to the target base station.

8. The method according to claim 6, wherein
    if the target base station fails to allocate a PCI to the target cell by selecting one from the second reference PCI set, then it sends a second response message to the OAM function entity to notify the OAM function entity that it has been failed to select a PCI for the target cell from the second reference PCI set.

9. The method according to claim 6, wherein the X2 interface message comprises: an X2 setup request message, an X2 setup response message and an eNB configuration update message.

10. The method according to claim 1, wherein the obtaining, by the target base station, a first reference PCI set in a predefined manner comprises:
    collecting, by the target base station via an X2 interface, the PCIs and the EARFCN information used by neighbour cells of cells supported by all base stations in X2 connection with the target base station; and
    removing, by the target base station, the PCIs of all cells whose EARFCN information is different from that of the target cell, reported by user equipment, from the PCIs of one or more cells corresponding to the collected EARFCN information different from that of the target cell to obtain one or more PCIs, and determines these PCIs as the first reference PCI set.

11. The method according to claim 10, wherein
    if the selectable PCI set is empty, then the target base station sends a first response message to the OAM function entity to notify the OAM function entity that it has been failed to select a PCI for the target cell from the selectable PCI set; and
    after obtaining the response message, the OAM function entity determines whether the target base station has selected a PCI for the target cell from the second reference PCI set and sends the result of the determination to the target base station.

12. The method according to claim 10, wherein
    if the target base station fails to allocate a PCI to the target cell by selecting one from the second reference PCI set, then it sends a second response message to the OAM function entity to notify the OAM function entity that it has been failed to select a PCI for the target cell from the second reference PCI set.

13. The method according to claim 10, wherein the X2 interface message comprises: an X2 setup request message, an X2 setup response message and an eNB configuration update message.

14. The method according to claim 1, wherein the obtaining, by the target base station, a first reference PCI set in a predefined manner comprises:
   collecting, by the target base station, the PCIs and the EARFCN information of surrounding cells reported by user equipment, the PCIs and the EARFCN information of cells supported by all base stations in X2 connection with the target base station via an X2 interfaces, the PCIs and the EARFCN information used by neighbour cells of cells supported by all base stations, and the PCIs and the EARFCN information of the surrounding cells monitored by the target base station itself; and
   determining, by the target base station the PCIs of one or more cells corresponding to the collected EARFCN information different from that of the target cell as the first reference PCI set.

15. The method according to claim 14, wherein
   if the selectable PCI set is empty, then the target base station sends a first response message to the OAM function entity to notify the OAM function entity that it has been failed to select a PCI for the target cell from the selectable PCI set; and
   after obtaining the response message, the OAM function entity determines whether the target base station has selected a PCI for the target cell from the second reference PCI set and sends the result of the determination to the target base station.

16. The method according to claim 14, wherein
   if the target base station fails to allocate a PCI to the target cell by selecting one from the second reference PCI set, then it sends a second response message to the OAM function entity to notify the OAM function entity that it has been failed to select a PCI for the target cell from the second reference PCI set.

17. The method according to claim 14, wherein the X2 interface message comprises: an X2 setup request message, an X2 setup response message and an eNB configuration update message.

18. The method according to claim 1, wherein
   if the selectable PCI set is empty, then the target base station sends a first response message to the OAM function entity to notify the OAM function entity that it has been failed to select a PCI for the target cell from the selectable PCI set; and
   after obtaining the response message, the OAM function entity determines whether the target base station has selected a PCI for the target cell from the second reference PCI set and sends the result of the determination to the target base station.

19. The method according to claim 1, wherein
   if the target base station fails to allocate a PCI to the target cell by selecting one from the second reference PCI set, then it sends a second response message to the OAM function entity to notify the OAM function entity that it has been failed to select a PCI for the target cell from the second reference PCI set.

20. The method according to claim 1, wherein the X2 interface message comprises at least one of: an X2 setup request message, an X2 setup response message and an eNB configuration update message.

21. A base station, comprising:
   a first obtaining module, which is used for obtaining a usable PCI list sent by an Operations And Maintenance (OAM) function entity and limited PCIs of a target cell;
   a first processing module, which is used for removing the limited PCIs of the target cell from the usable PCI list to obtain a selectable PCI set;
   a second obtaining module, which is used for obtaining a first reference PCI set in a predefined manner according to E-UTRA Absolute Radio Frequency Channel Number (EARFCN) information of a cell obtained by an X2 interface message, wherein the cell EARFCN information in the first reference PCI set is different from that of the target cell;
   a second processing module, which is used for forming a second reference PCI set based on the intersection of the first reference PCI set obtained by the second obtaining module and the usable PCI list;
   a selecting module, which is used for selecting a PCI for the target cell; and
   a calling module, which is used for calling the selecting module which randomly selects a PCI from the selectable PCI set obtained by the first processing module as the PCI of the target cell, and randomly selects a PCI from the second reference PCI set obtained by the second processing module as the PCI of the target cell if the selectable PCI set is empty.

* * * * *